US009033273B2

(12) United States Patent
Edelson et al.

(10) Patent No.: US 9,033,273 B2
(45) Date of Patent: May 19, 2015

(54) INTEGRATED AIRCRAFT GROUND NAVIGATION CONTROL SYSTEM

(76) Inventors: Jonathan Edelson, North Plains, OR (US); Neal Gilleran, Long Beach, CA (US); Isaiah Cox, Baltimore, MD (US); Scott Perkins, Kent, WA (US); Robert Sweet, Beaver, UT (US)

( * ) Notice: Subject to any disclaimer, the term of this patent is extended or adjusted under 35 U.S.C. 154(b) by 653 days.

(21) Appl. No.: 13/287,115

(22) Filed: Nov. 1, 2011

(65) Prior Publication Data

US 2012/0168557 A1 Jul. 5, 2012

Related U.S. Application Data

(60) Provisional application No. 61/409,117, filed on Nov. 2, 2010.

(51) Int. Cl.
| | | |
|---|---|---|
| B64C 25/00 | (2006.01) | |
| B64C 25/40 | (2006.01) | |
| G08G 5/06 | (2006.01) | |

(52) U.S. Cl.
CPC .............. *B64C 25/405* (2013.01); *G08G 5/065* (2013.01); *Y02T 50/823* (2013.01)

(58) Field of Classification Search
CPC ...... B64C 25/40; B64C 25/405; B64C 25/50; B64C 25/505
USPC ............................... 244/50, 56, 103 S, 103 R
See application file for complete search history.

(56) References Cited

U.S. PATENT DOCUMENTS

| | | | | |
|---|---|---|---|---|
| 2,320,547 | A * | 6/1943 | Tiger | 244/103 S |
| 3,428,274 | A * | 2/1969 | Ellis et al. | 244/103 R |
| 3,764,094 | A * | 10/1973 | Cross | 244/50 |
| 3,874,619 | A * | 4/1975 | Collins et al. | 244/50 |
| 4,955,777 | A * | 9/1990 | Ineson | 244/50 |
| 7,520,463 | B2 * | 4/2009 | Lepine et al. | 244/1 TD |
| 2006/0065779 | A1* | 3/2006 | McCoskey et al. | 244/100 R |
| 2008/0103642 | A1* | 5/2008 | Cox et al. | 701/3 |
| 2009/0014261 | A1* | 1/2009 | Edelson et al. | 188/156 |
| 2009/0114765 | A1* | 5/2009 | Cox et al. | 244/50 |
| 2009/0261197 | A1* | 10/2009 | Cox et al. | 244/50 |
| 2010/0276535 | A1* | 11/2010 | Charuel et al. | 244/50 |

\* cited by examiner

*Primary Examiner* — Rob Swiatek
*Assistant Examiner* — Marc Burgess

(57) ABSTRACT

An aircraft ground control system that moves an aircraft on the ground between landing and take off without external mechanical assistance from airport tugs or tow vehicles or reliance on thrust produced by the aircraft's engines is provided. The aircraft ground control system interfaces only with an aircraft auxiliary power unit or other aircraft power supply, but otherwise operates independently of aircraft systems. A system integrator and controller links cockpit controls designed to actuate the transmission of power to system components and to activate system components only under predetermined conditions with selectively activatable drivers in driving connection with one or more aircraft wheels to move the aircraft on the ground at selected torques and speeds.

16 Claims, 4 Drawing Sheets

INTEGRATED AIRCRAFT GROUND NAVIGATION CONTROL SYSTEM

PRIORITY

This application claims priority from U.S. Provisional Application No. 61/409,117, filed Nov. 2, 2010, the disclosure of which is fully incorporated herein by reference.

TECHNICAL FIELD

The present invention relates generally to control apparatus and processes for moving aircraft on the ground between landing and take off and specifically to an integrated system independent from other aircraft systems for controlling movement on the ground of the aircraft without assistance from external tow vehicles or like apparatus.

BACKGROUND OF THE INVENTION

Commercial airports throughout the world have become extremely busy as air traffic has increased. Many airports may not have sufficient landing or gate facilities to accommodate all of the aircraft scheduled to arrive and take off from the airport, particularly if there is a deviation from the flight schedule. Moving aircraft efficiently on the ground, first between landing and the gate or other landing facility to discharge passengers and cargo and then from the gate to the runway for take off, can pose challenges. Most aircraft currently require external tow vehicles or tugs to move them into or out of a gate or other landing facility. The aircraft's jet engines may also be used to help move the aircraft into or away from a gate. Both of these methods, while useful for moving aircraft, have disadvantages. Tow vehicles may not always be available for all aircraft when needed, especially when air traffic is heavy. The lack of availability of a tug or tow vehicle has the potential to delay significantly the aircraft's arrival at or departure from a gate. Waiting during such delays can be especially frustrating for passengers and crew. It is possible to back an aircraft away from a gate using the engine's reverse thrust. This process is generally prohibited, however, because reverse thrust engine operation picks up foreign object debris (FOD) and directs FOD from the engine toward the gate, airport terminal, and everything in between.

If an aircraft's main jet engines' thrust is used to move it into the gate or on the ground, fuel consumption, engine emissions, and noise are significant concerns. Moreover, engine maintenance demands for this type of aircraft ground movement tend to be high. The use of motors separate from the aircraft jet engines' thrust to move aircraft on the ground can overcome these problems.

It has been suggested that aircraft can be moved on the ground by the connection of a motor to an aircraft nose wheel or drive wheel, thus avoiding the use of a tow vehicle or the aircraft engine turbines. U.S. Pat. No. 3,977,631 to Jenny and U.S. Pat. No. 7,445,178 to McCoskey et al disclose, respectively, a wheel drive system to facilitate aircraft ground handling and propulsion based on a modification of the wheel brake assembly and a powered nose aircraft wheel system that includes a geared motor with an automated control system. The systems described in these patents represent a general solution to the problem of moving an aircraft into and out of a gate or other landing facility without external assistance. They do not, however, suggest an independent integrated system for controlling the unassisted ground movement of an aircraft between landing and takeoff that ensures safe and efficient aircraft ground navigation.

The prior art describes hybrid aircraft vehicles adapted to be flown in the air and to be driven on the ground like an automobile. U.S. Pat. No. 4,881,701 to Bullard; U.S. Pat. No. 5,141,173 to Lay; and U.S. Pat. No. 5,836,541 to Pham, for example, disclose such vehicles. While these vehicles may function as aircraft, their movement on the ground is controlled by automobile type transmissions and engines. Lay describes the use of wheel motors, but does not suggest other components of an integrated aircraft ground control system that operates independently of other systems. The structural design considerations and control systems required to maneuver an aircraft safely and effectively between landing and take off in an airport setting, moreover, are quite different from those required to move an automobile on a road. None of the foregoing patents suggests that the structures described therein could function effectively to move aircraft that are not hybrid vehicles, nor is an integrated aircraft ground movement control system for controlling ground movement between landing and takeoff in a conventional aircraft even remotely contemplated.

In published U.S. Patent Application No. US/2009/026197A1, Cox et al describe a nose wheel control apparatus for driving a taxiing aircraft. While this control apparatus can effectively move the aircraft on the ground, an independent control system that integrates and controls all aircraft and system components required to move an aircraft on the ground between landing and takeoff without mechanical assistance from a tug or tow vehicle is not disclosed.

The prior art, therefore, fails to provide an independent integration and control system for controlling mechanically unassisted aircraft ground navigation that safely and effectively integrates and controls all aircraft and control system components required to move an aircraft on the ground between landing and takeoff.

SUMMARY OF THE INVENTION

It is a primary object of the present invention, therefore, to provide an independent control system for controlling mechanically unassisted aircraft ground navigation that safely and effectively integrates and controls all aircraft and control system components required to move an aircraft on the ground between landing and takeoff.

It is another object of the present invention to provide an integrated system for safely and effectively moving an aircraft on the ground between landing and takeoff wherein all system components are integral with yet operate substantially independently from other aircraft operating systems.

It is further object of the present invention to provide an integrated system for controlling the ground movement of an aircraft that does not require interaction with the aircraft's data bus.

It is an additional object of the present invention to provide an integration and control system for an aircraft ground movement control system that ensures operation of the ground movement system only when the aircraft is moving on the ground.

It is yet another object of the present invention to provide an integrated system for controlling ground movement of an aircraft that can be installed on an existing aircraft without major changes to the aircraft's landing gear components.

It is yet a further object of the present invention to provide a control system and drive system for unassisted aircraft ground movement that may be powered by a power source, including the aircraft's auxiliary power unit, that does not rely on the aircraft's main engines.

It is yet a further object of the present invention to provide a control system for the unassisted ground movement of an aircraft between landing and take off that includes operational limits and a failsafe system that ensures that the ground movement control system will not operate if the operational limits are met.

It is yet an additional object of the present invention to provide a control system for an aircraft ground movement control system with control functions accessible internally from a cockpit controls array and remotely from a location external to the aircraft.

It is yet another object of the present invention to provide a control system for the unassisted ground movement of an aircraft designed to be installed during the construction of new aircraft or to be retrofitted on existing aircraft with minimal changes to landing gear and other aircraft components.

In accordance with the aforesaid objects, the present invention provides an independent control system for controlling mechanically unassisted aircraft ground navigation that safely and effectively integrates and controls all aircraft and control system components required to move an aircraft on the ground between landing and takeoff without complete reliance on the aircraft's main engines or external tow vehicles. The present invention further provides an aircraft ground movement control system that operationally integrates, independently of other aircraft systems, internal and external aircraft components to control the movement on the ground of an aircraft without the use of tow vehicles or thrust from the aircraft's main engines. The ground movement control system of the present invention is designed for use on an aircraft that has one or more wheels capable of being powered to drive the aircraft independently on the ground, an array of controls in the aircraft cockpit, and a power source, such as an auxiliary power unit.

The internal and external aircraft components operationally integrated by the present ground movement control system includes a driver for driving the aircraft nose wheel, a driver control in the cockpit control array for directing the driver to operate at a selected speed and/or torque, a power distributor in operative communication with the aircraft auxiliary power unit or other power supply for providing power to the driver and the driver control during operation of the ground movement control system, and a system integrator and controller operatively connected with the driver, the driver control, and the power distributor to interface with the driver, the driver control, and the power distributor for providing power to and communication among these components and to monitor and activate each component as required. The system integrator and controller further includes components to monitor the operation of and to deactivate the driver, driver control, and power distributor when the system integrator and controller receives information indicating that continued operation of these components would not be safe.

Other aspects of the present aircraft ground movement control system and objects of the present invention will become apparent from the following description, drawings, and claims.

DESCRIPTION OF THE INVENTION

Figure 1:
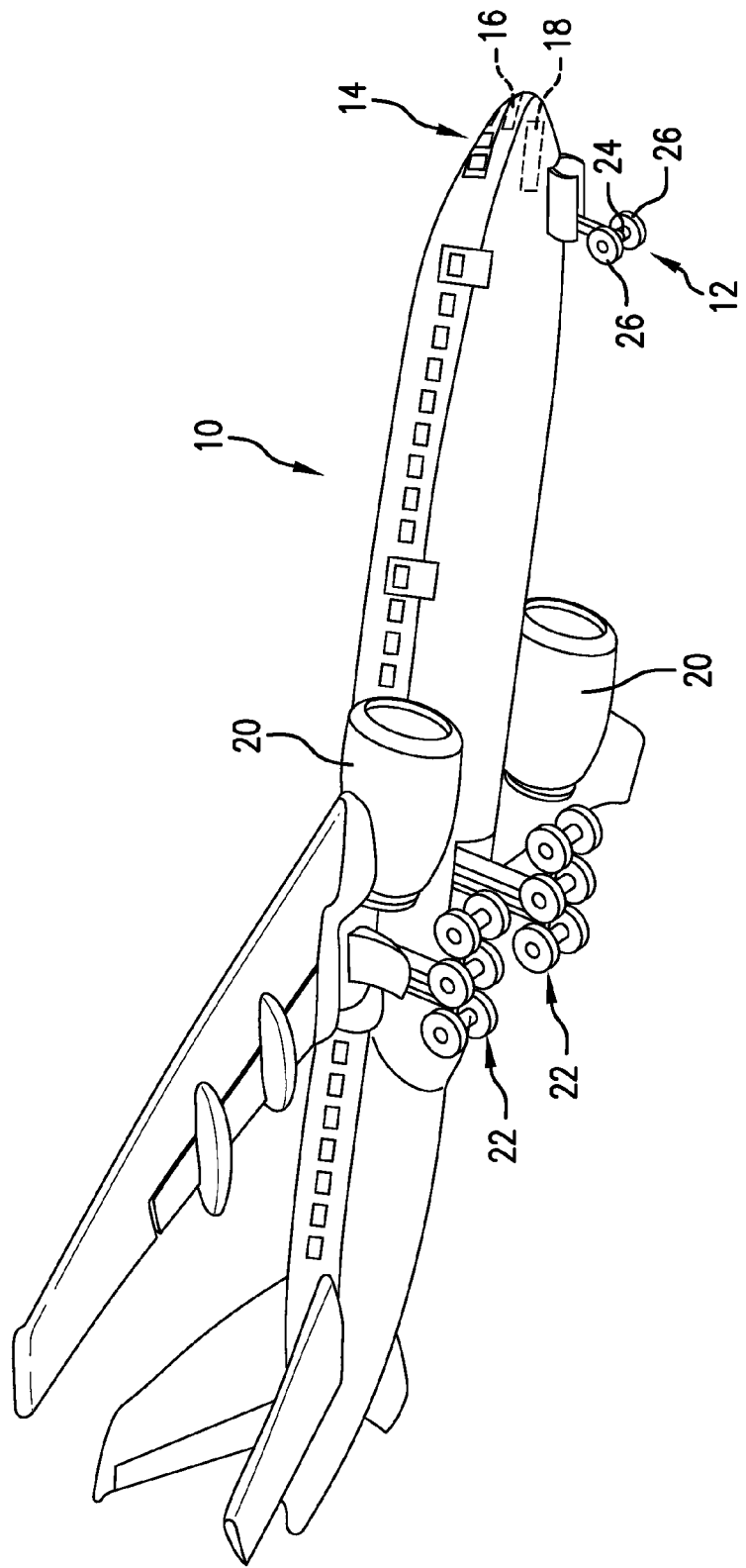
FIG. 1 is a side view of an aircraft showing possible locations of selected components of the aircraft ground movement control system of the present invention.

Currently available airport ground traffic control systems present several disadvantages that the aircraft ground movement control system of the present invention addresses and overcomes. Most aircraft ground movement between landing and takeoff is produced by a combination of aircraft engine operation and tow vehicles. Implementation of the ground movement control system of the present invention means that it will no longer be necessary for airports to provide and maintain a full fleet of tow vehicles or tugs to push aircraft back from gates or other landing facilities to enable the aircraft to reach assigned runways prior to take off or to tow aircraft at other times. In almost all cases, aircraft main jet engines will no longer be required to operate when the aircraft is on the ground, which will produce fuel savings, noise reduction, and reduced engine turbine maintenance resulting from reduced engine operation. The movement of the aircraft on the ground between landing and take off can be precisely controlled internally by cockpit personnel and externally by ground personnel to direct the ground travel of the aircraft between gate and runway without waiting for a tow vehicle. Delays of aircraft departures and arrivals due to the unavailability of tow vehicles can thus be significantly reduced, if not eliminated altogether.

The aircraft ground movement control system of the present invention is designed and configured to operate substantially completely independently from other aircraft systems, with the exception of a source of power, such as, for example, the aircraft auxiliary power unit (APU). Power for certain of the ground movement control system components is preferably drawn from the aircraft APU power distribution systems, although power could also be provided by other power sources, as described below. No data is shared between aircraft control systems and the present ground movement control system, moreover, so interaction with the aircraft's data bus is not required.

The aircraft ground movement control system of the present invention is designed to be operational only when the aircraft is moving on the ground and nonoperational when the aircraft is no longer on the ground or under selected conditions when the aircraft is moving on the ground or to ensure safe operation of the aircraft. To achieve this, the ground movement control system of the present invention includes sensing, monitoring, communication, and control components in a failsafe system with multiple redundancies to ensure deactivation of the system when conditions indicate that its operation should not be continued.

The ground movement control system of the present invention is particularly useful in an aircraft of the type that has one or more nose wheels or other wheels capable of being powered to drive the aircraft independently on the ground, a cockpit controls array that includes controls which can be activated manually or set to be activated automatically to perform various aircraft functions. The controls array may also include monitors and indicators that communicate required and selected information to the pilot and other cockpit personnel as required for the safe operation of the aircraft. The aircraft also will include a power source that can be an auxiliary power unit or other source of power.

Figure 3A:
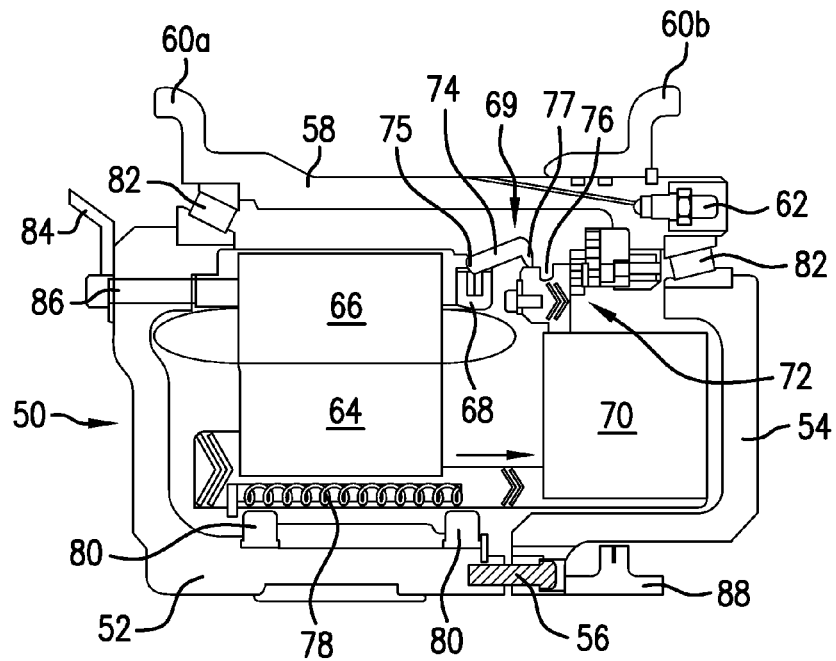
FIGS. 3a and 3b are diagrammatic views of one embodiment of a wheel driver assembly installed on an aircraft nose wheel in accordance with the ground movement control system of the present invention.
Figure 3B:
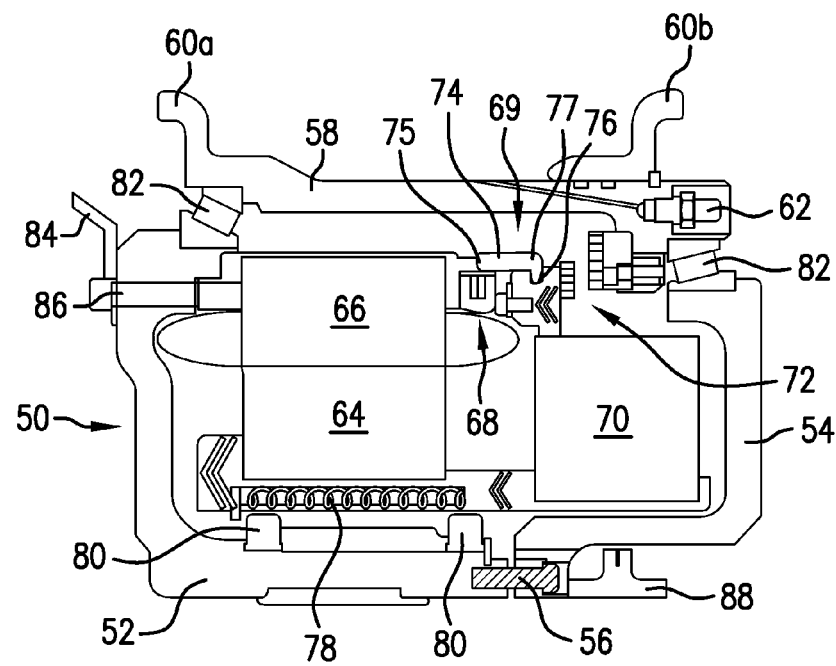

FIG. 1 illustrates an aircraft 10, which includes a nose wheel assembly 12, a cockpit 14 where the cockpit control array 16 is located, and an auxiliary power unit or other power supply, shown schematically at 18. The aircraft engines 20 and main landing gear wheel assemblies 22 are also shown. At least one wheel driver assembly 50, described below in connection with FIGS. 3a and 3b, is located at 24 in the nose wheel assembly 12. Each wheel 26 in the nose wheel 12 may be driven by its own wheel driver assembly. Alternatively, one or more main wheels in the main wheel assemblies 22 could be driven by wheel driver assemblies in accordance with the present invention. While a preferred location for the wheel driver assemblies 50 of the present invention is inside or outside one or more nose or main wheels, the driver components of the wheel driver assembly, described and shown in connection with FIGS. 3a and 3b, could also be located in any convenient location in or on the aircraft where these components can be connected with one or more aircraft wheels.

Figure 2:
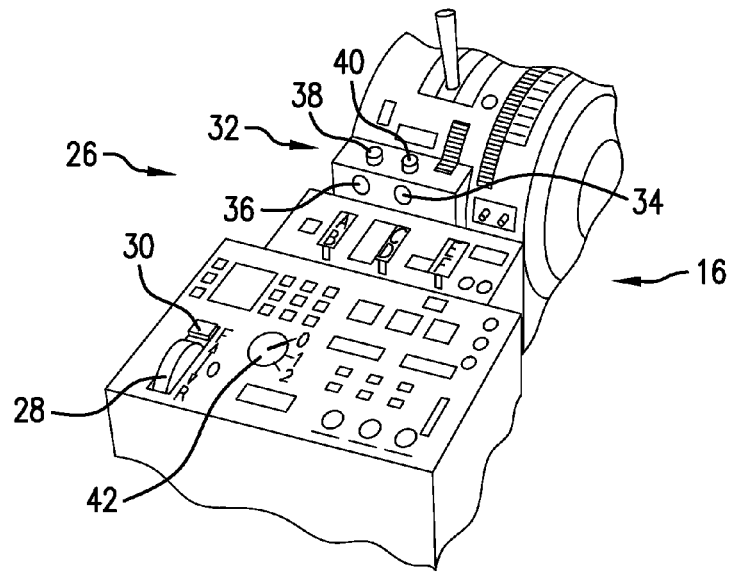
FIG. 2 is a perspective view of a portion of one embodiment of an aircraft cockpit control array that includes cockpit controls according to the present invention.

Control of the operation of the present ground movement control system from the cockpit is effected by the actuation of components that are easily added, such as in the form of a cockpit controls kit, to an aircraft's existing standard cockpit controls array 16, shown in greater detail in FIG. 2. FIG. 2 illustrates one possible arrangement of manually actuated components that can be used to control operation of the present aircraft ground movement control system. Other arrangements and configurations of controls are contemplated to be within the scope of the present invention, and this arrangement is not intended to be limiting. The components of a cockpit controls kit provide an interface between the pilot and the ground movement control system integrator and controller components. As shown in FIG. 2, the cockpit controls may include a pilot input device 28 with an activatable lock feature 30 that may be manually or automatically activated, indicators 32, and a guarded multiple position switch 42. These components are preferably located in positions on the cockpit controls array 16 that are accessible by the pilot and, if required in extraordinary circumstances, accessible by the co-pilot or another flight crew member.

The pilot input device may be a thumbwheel, as shown at 28, which is operationally and drivingly connected to the aircraft nose wheel 12 or drive wheel. Although a thumbwheel is one preferred pilot input device, other pilot input devices, such as, for example, joysticks, track pads, roller balls, switches, dials, potentiometers, touch screens, keyboards, toggles, wheels, levers, and voice-activated devices could also be used for this purpose. Movement of the thumbwheel 28 interfaces with one or more wheel driver assemblies 50, as will be described in connection with FIGS. 3a and 3b, to move the aircraft nose wheel 12 in a desired direction at a desired torque and speed.

The thumbwheel 28 can have any one of a number of configurations suitable for performing this function. Preferably, the thumbwheel 28 is a proportional single axis type of thumbwheel that can be moved from a neutral position forward (toward the front of the aircraft) and reverse (toward the rear of the aircraft), designated by "F" and "R", respectively on the cockpit control array 16. Other configurations that perform the same functions are also intended to be included within the scope of the present invention. The movement of the thumbwheel 28 in a forward direction corresponds to the forward movement of the aircraft, and the movement of the thumbwheel 28 in a reverse direction corresponds to the backward or reverse movement of the aircraft. The thumbwheel 28 is preferably set so that it is linearly scaled between zero torque and the maximum forward torque needed to drive a drive nose wheel or main wheel. As a result, if the thumbwheel is moved to a position one-third of the way forward, the torque requested is one-third of the maximum nose wheel forward torque.

Redundant springs (not shown) are preferably provided to move the thumbwheel 28 between a position in which the nose wheel is actively driven at a desired torque and a zero torque position. This ensures that when the thumbwheel 28 is not actively controlled by the pilot or held at a desired setting by the lock 30 as described below, the thumbwheel will always return to a zero torque setting. Additionally, the release of the thumbwheel from a forward or reverse position will return it to a neutral position, with the result that the wheel driver is deactivated, and the aircraft is not actively driven in either a forward or a reverse direction.

The thumbwheel 28 also preferably includes an override torque setting in the event that conditions require a torque above the preset maximum. The pilot is able to move the thumbwheel beyond the maximum torque setting to produce an overload torque. Since this is not a normal operating condition, movement of the thumbwheel 28 to the override setting is accomplished with considerably higher resistance, making the pilot aware that the operating conditions are not normal.

The lock mechanism 30, which may be constructed in any one of a number of convenient configurations, has a function that is similar to that of cruise control in an automobile. Lock 30 can be used to maintain the thumbwheel 28 in a position that maintains the nose wheel driver at a desired torque or speed setting. Once the pilot has brought the aircraft to this desired setting using the thumbwheel 28, the lock 30 is engaged, this information is communicated to the wheel driver, and the ground movement controller instructs the driver to apply the necessary forward speed and torque to maintain the speed and torque that was set when the lock 30 was engaged. Disengagement of the lock 30 could occur if any one of the following events occurs. If the pilot intentionally or unintentionally moves the lock, disengaging it, the thumbwheel 28 will return to a neutral or a zero torque position. If the pilot moves the thumbwheel 28, the lock 30 will be released. If the pilot applies the aircraft's brakes, the lock 30 will be released, the thumbwheel 28 will return to a neutral or zero torque position, and the nose wheel driver will be inactivated. Any new pilot input to a ground movement control system component or to a component that interfaces with a ground movement control system component will override a previously set torque and speed setting.

A number of indicators 32 may be included on the cockpit controls array 16 to provide information regarding the status of the ground movement control system and to alert the cockpit crew to take the action required by the system status or that no action is required. The indicators 32 are preferably lights of the type available for use in aircraft cockpit arrays and will include at least one light 34 to indicate that the ground movement control system is in operation and operating normally and one light 36 to indicate that the ground movement control system is not operating normally, requiring appropriate action by the cockpit crew. Since the aircraft ground movement control system of the present invention is not intended to be actuated at take off or when the aircraft is in the air, an indicator 38 should be included in the cockpit controls kit, preferably a flashing red light or the like, to warn the cockpit crew that the aircraft is not ready for take off. In addition, one or more other flashing or strobe-type lights 40 could be provided to indicate specific system conditions or faults.

The cockpit controls further include a guarded multiple position power switch 42 that can be directly activated by the pilot to power the aircraft ground movement control system of the present invention. The power switch 42 can be located in any convenient space accessible to the pilot in the aircraft cockpit controls array 16. Ideally, the power switch 42 provides at least three setting corresponding to three power levels. Level 0 is the OFF mode; the aircraft ground movement control system and all of its components are completely unpowered. Level 1 is the LOGIC mode; at this power level only a system microprocessor and field programmable gate array (FPGA) and parasitic components such as, for example, cockpit controls, sensors, and cooling fans are powered. Level 2 is the POWER mode; primary loads, including the nose wheel drivers, are powered, and current flows to them. No power flows to the drivers at any other power setting.

Movement of an aircraft by the aircraft ground movement control system of the present invention is achieved by one or more drivers mounted in driving relationship with one or more of the aircraft nose wheels or main wheels to move the nose or main wheel at a desired speed and torque. One type of driver preferred for this purpose is a high phase order electric motor of the type described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference.

The foregoing examples are not intended to be limiting, and other motor designs capable of high torque operation across the speed range that can be integrated as drivers into an aircraft nose or main wheel or other aircraft location to drive one or more wheels as described herein may also be suitable for use in the aircraft ground movement control system of the present invention. Hydraulic and pneumatic drivers and motors capable of being powered to function as the drivers described herein are also contemplated to be within the scope of the present invention.

One embodiment of an aircraft wheel driver assembly 50 in accordance with the present invention is shown in FIGS. 3a and 3b. An example of one type of driver preferred for use in a wheel driver assembly in the present aircraft ground movement control system has a top tangential speed of 15,000 linear feet per minute and a maximum rotor speed of 7200 rpm, or about 28 miles per hour.

Referring to the drawings, FIGS. 3a and 3b are diagrammatic illustrations of a wheel driver assembly 50 preferred for use with the aircraft ground movement control system of the present invention. Although only one wheel driver assembly 50 is shown, a wheel driver assembly 50 may be operatively and drivingly connected to more than one wheel in an aircraft nose wheel or main wheel assembly. FIG. 3a shows the driver in an activated position, in which the driver is capable of powering an aircraft wheel to move the aircraft on the ground, and FIG. 3b shows the driver in a deactivated position, in which the driver is locked and incapable of powering an aircraft wheel to move the aircraft on the ground. Each wheel driver assembly 50 includes an inboard wheel support 52 removably attached to an outboard wheel support 54, preferably by a bolt 56. A wheel structure 58 extends between the inboard and outboard wheel supports and additionally supports tire flanges 60a and 60b to mount a tire (not shown). Access to a tire inflation valve 62 is included adjacent to one tire flange (60b). The wheel driver assembly 50 drive components include a rotor 64, a stator 66, a solenoid 68, and a gear assembly 70 drivingly connected to the stator 66 by a clutch assembly 72. A preferred gear assembly 70 includes planetary gears with a ratio of about 20:1, although other types of gearing and ratios are contemplated to be within the scope of the present invention. Although not shown in FIGS. 3a and 3b, electrical and control connections and interfaces from the aircraft APU or other power source, power distributors, and the cockpit controls are provided to power and control the components of the wheel driver assembly 50.

Engagement and disengagement of the driver components in the wheel driver assembly 50 may be accomplished by the selected activation and deactivation of a solenoid lock assembly 69. The solenoid lock assembly 69 includes a latch arm 74 pivotally connected at a first pivot end 75 to the solenoid 68. A second lock end 77 of the latch arm 74 is configured to contact and be engagingly retained in a correspondingly configured groove 76. The hook shape of lock end 77 is one convenient configuration for this structure. Other configurations suitable for retaining a pivoted arm securely in a locked position than the one shown in FIGS. 3a and 3b are also contemplated to be within the scope of the present invention. When the solenoid lock assembly 69 is in the driver activated condition shown in FIG. 3a, the latch arm 74 lock end 77 is pivoted away from contact with the groove 76 to disengage the solenoid lock assembly 69, and the clutch assembly 72 is drivingly connected between the gear assembly 70, the solenoid 68, and the stator 66, and the driver can be powered and operated to drive the aircraft nose wheel. When the solenoid lock assembly 69 is in the driver deactivated condition shown in FIG. 3b, however, the latch arm 74 is pivoted so that lock end 77 is fully engaged and locked by the groove 76. The clutch assembly 72 is moved out of driving contact with the gear assembly 70, and the solenoid 68, stator 66, and rotor 64 cannot be powered or operated to drive the aircraft wheel in this deactivated condition. A spring 78 mounted adjacent to the rotor 64 helps to hold the gear assembly 70 and clutch assembly 72 out of engagement with the stator 66, thus further preventing operation of the driver components in the deactivated position described above.

The driver components (rotor 64, stator 66, solenoid 68, gear assembly 70, and clutch assembly 72) are supported on the wheel assembly by bearings 80 and 82. The stator 66 may be connected to a torque takeout arm 84 through a bolt 86. Additional bolts (not shown) preferably connect the stator to the inboard wheel support 52. Axle nut 88 is positioned to facilitate removal of the wheel driver assembly 50 when removal of the assembly is required. The driver components are not structural elements of the wheel driver assembly 50, are not part of the assembly shock chain, and, therefore, should not require bearings capable of carrying a different shock load than the bearings currently used in aircraft wheel assemblies. The bearings 80, 82 are preferably larger than those currently used in aircraft wheel assemblies, which should permit more travel and more even load distribution, leading to longer bearing life. Additionally, the larger bearing size allows for removal of the wheel (not shown) and tire changes without removing any other hardware. The addition of a wheel driver assembly 50 of the present invention to an existing aircraft wheel should not affect the speed with which tires can be changed.

Substantially all of the torque generated by the wheel driver assembly 50 preferably goes out from the torque takeout arm 84. Support for the stator 66 is grounded back to the torque takeout arm 84. The torque takeout arm 84 will require some modification if it is desired, alternatively, to control aircraft ground movement with the system of the present invention or to provide a connection for the aircraft to a tug or tow vehicle. It is contemplated that the bolt 86 and the other bolts (not shown) securing the stator 66 to the inboard wheel support 52 additionally could be used as a torque device between the stator 66 and a tow bar fitting (not shown) that could be attached to a tug or tow vehicle, thus providing the option of using mechanical assistance for maneuvering the aircraft, if needed.

A speed sensor (not shown) could be installed in communication with one of the wheel driver assembly 50 moving components, such as, for example, the rotor 64, so that the speed of the wheel can be determined accurately, permitting engagement of the aircraft ground movement control system at an optimum time during operation of the system. The use of a speed sensor will allow the driver speed and the wheel speed to be synchronized prior to engagement of the driver before pins or other clutch assembly hardware (not shown) engage between the wheel and the gear assembly 70. This could eliminate the need for a clutch.

The wheel driver assembly 50 shown in FIGS. 3a and 3b does not increase spin-up loads during landing. The only spin-up structure in the wheel driver assembly is the wheel structure 58.

The wheel driver assembly 50 may or may not be ventilated. In the event that the motor assembly is not ventilated, the motor components can serve as a primary thermal heat sink. Secondary heat removal routes direct heat from the stator 66 through to the inboard wheel support 52 and the outboard wheel support 54. The wheel axle (not shown) and the air outside the aircraft can also function as heat sinks.

The wheel driver assembly of the present invention may be installed during aircraft construction, but may also be easily retrofitted on existing aircraft. No significant changes to existing landing gear components, most especially to pistons and axles, are required.

The supply of power to the aircraft ground movement control system of the present invention is achieved by the interconnection and interaction between a power source, preferably the aircraft's auxiliary power unit (APU), and associated power distribution system and the power distribution components that are part of the present aircraft ground movement control system. Power sources other than the aircraft's APU could be used to supplement or replace the APU to power the wheel driver assembly 50. Such power sources include, for example and without limitation, batteries, fuel cells, any kind of solar power, devices provided under the name POWERCHIPS™, burn boxes, and the like. If the APU or other power sources are not available, the aircraft's engines may be used as a source of power, if necessary.

One or more wire harnesses (not shown) are provided to electrically connect the ground movement control system to the aircraft power source. The aircraft auxiliary power unit (APU) is the preferred source of AC and DC power for the present ground movement control system. In the event this power source is not available, power generated by the aircraft engines or the aforementioned power sources could be used to provide this power. Appropriate circuit breakers are provided in the ground movement control system to handle the required loads. Components of one preferred type of wire harness include power wires (not shown) that provide power from the aircraft APU or other power source to components of the ground movement control system. AC power is provided in connection with one or more inverters (not shown) to drive the wheel driver assembly 50.

DC power is provided from the APU or other power source to control components of the system, specifically the cockpit controls thumbwheel 28, lock 30, switch 42, indicators 36, 38, and 40 (FIG. 2) and the system integrator and controller (not shown). When the switch 42 is moved to a Level 1 LOGIC mode setting or to a Level 2 POWER mode setting, power will flow from the aircraft APU to the ground movement control system through the switch. When the switch 42 is at a Level 0 OFF mode setting, no power flows to the system. When the switch 42 is in the POWER mode, power flows through another wire harness (not shown) to power driver components, including rotor 64, stator 66, solenoid 68, and gear assembly 70, in the wheel driver assembly 50 (FIGS. 3a and 3b). Signals from the wheel driver assembly 50, for example, from solenoid lock assembly 69 indicating engagement or disengagement of the motor gears with the rotor 64 and stator 66, from speed sensors (not shown) indicating the speed of rotation of the aircraft wheels, and from temperature sensors (not shown) in the motor indicating motor temperature.

Signal and communication conduits within the aircraft ground movement control system provide data and signal communication in digital or analog form as required between the system integrator and controller and system components.

The wires selected to provide connections between the aircraft APU or other power source, the cockpit controls switch 42, the wheel driver assembly 50, and the system integrator and controller (not shown) are the types of shielded and jacketed rigid and flexible cables and wires typically used for this purpose.

Figure 4:
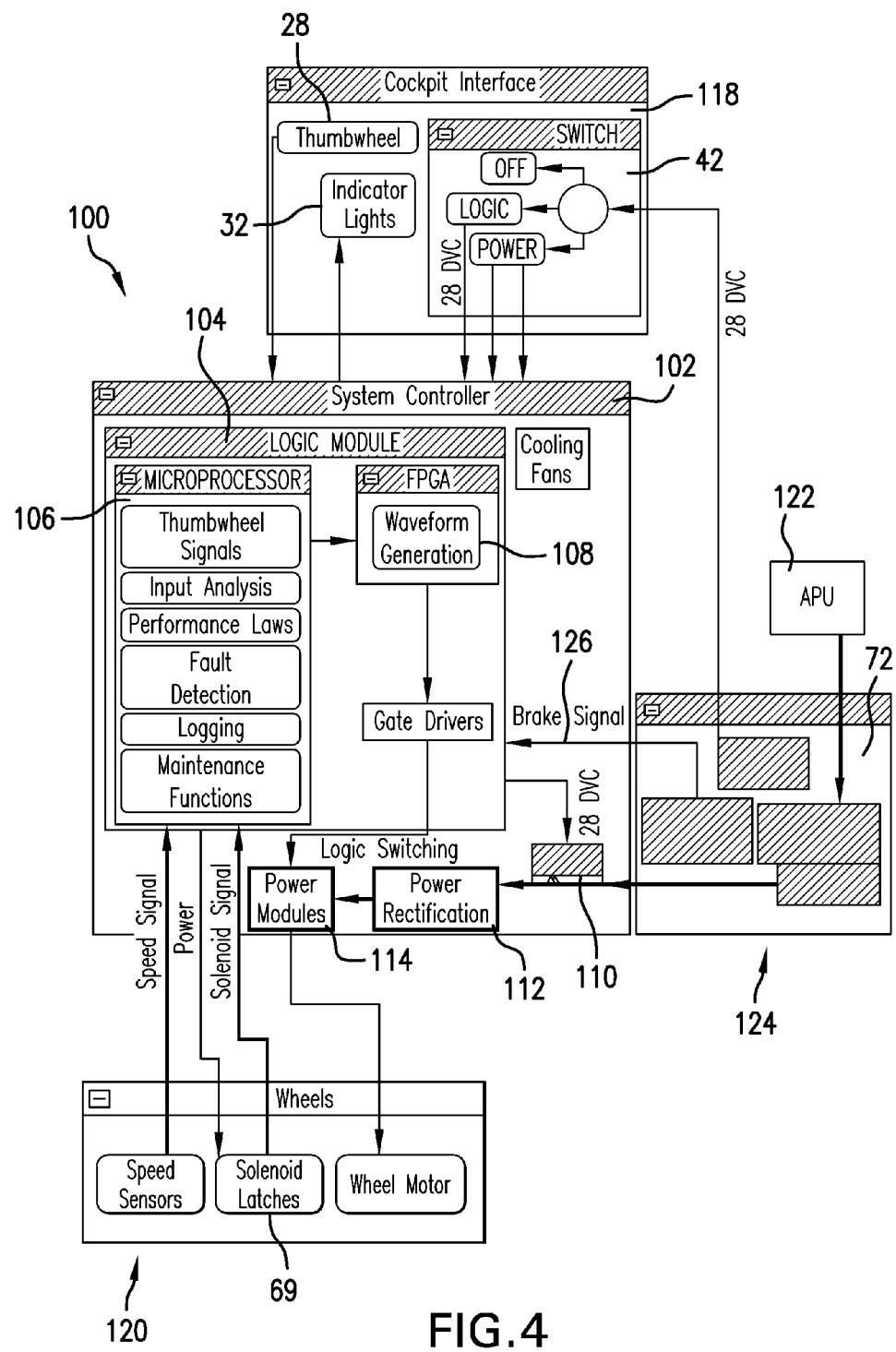
FIG. 4 is a block diagram of one embodiment of a system integrator and controller designed for the control and coordination of the operation of the aircraft ground movement control system of the present invention.

The aircraft ground movement system integrator and controller, shown in block diagram in FIG. 4, provides an interface between the aircraft electrical distribution system and the portion of the ground movement control system that receives 115 volts of AC power and the ground movement control system cockpit control components, including thumbwheel 28 and switch 42, that receive 28 volts of DC power to power the logic functions and parasitic components such as cooling fans. The system integrator and controller also interfaces with each ground movement control system component to provide AC or DC power to each as needed and to provide input/output communication, control, monitoring, and signaling.

FIG. 4 shows one embodiment of a system integrator and controller useful for integrating and controlling interaction and communication between and among the components of the aircraft ground movement control system of the present invention. Other arrangements are also possible and are contemplated to be within the scope of the present invention. The system integrator and controller 100 is responsible for control and communication functions, monitoring and indicator functions, and fault detection and fault logging for each system component. A DC link voltage pulse width modulation high phase order system is preferred for this purpose. The only external interface between the present aircraft ground movement control system and the aircraft's systems is positioned between the system integrator and controller and the aircraft electrical distribution system. Consequently, operation is completely independent of every other aircraft system, and no data is shared with any other aircraft system.

The system integrator and controller includes a system controller module 102 with a logic module 104. Included in the logic module 104 are a microprocessor 106 and field programmable gate array 108. The system controller module 102 may also include various power-receiving and processing components, such as, for example, a DC control contactor 110, power rectifiers 112, and power modules 114. One or more cooling fans 116 is preferably included to maintain an optimum operating temperature for the system controller components.

A cockpit interface 118 provides communication and control for cockpit components of the present invention, including the thumbwheel 28, indicator lights 32, and switch 42 (FIG. 2). In addition, the interface between the system controller and the aircraft APU routes DC power through the power switch 42 to power the functions of the logic module 104 and fans 116 of the system controller.

A wheel interface 120 directs power to the wheel motor to power components 64, 66, 68, and 70 (FIGS. 3a and 3b). Signals from the wheel assembly solenoid lock 69 are communicated to the microprocessor 106, and the solenoid lock 69 is powered by the system controller to pivot the latch arm 74 out of a locked or unlocked position as described above to engage or disengage the wheel assembly as required. Information from speed sensors associated with the wheel can be directed to the microprocessor for appropriate response and action.

The system integrator and controller 100 draws power from the aircraft's APU 122. As indicated above, power could also be provided by other power sources. Various electrical components, connectors, and processors, including wire harness components, needed to distribute AC and DC power to the aircraft ground movement control system components are designated generally at 124 in FIG. 4. The power provided to the wheel driver assembly 50 must be high phase order output for optimal function of the system when the driver is an electric motor as described above. The preferred high phase order electric motor requires phase modules arranged in series to provide the high phase order output needed by each wheel motor.

An aircraft brake signal, designated 126, can be transmitted to the logic module 104 for processing and appropriate action as part of the failsafe system described below. In addition, a maintenance interface (not shown), preferably in the form of a plug in data link is provided to allow maintenance personnel access to system data and facilitates periodic monitoring of the system and necessary maintenance.

Faults in each system component may be detected and logged by the system integrator and controller. The system integrator and controller 100 preferably also includes control logic functions and the software functions necessary for the operation of the ground movement control system of the present invention, including, for example, all of the required feedback loops for speed mode, torque mode, motor/clutch engagement, and other system functions.

A unique feature of the aircraft ground movement control system of the present invention is the failsafe operation built into the system to limit or prevent operation of the ground movement control system when conditions indicate that operation is not safe. The multiple position switch 42 in the cockpit controls array 16 (FIG. 2) has two settings that direct power flow through the system. The first setting, which is the LOGIC mode, powers only the computer logic 104, fans 116, and sensors, such as the speed sensor, to determine whether activation of the entire system is safe. The wheel driver assembly 50 is not activated in flight or on the runway prior to take off, and the driver components should be in the relative positions shown in FIG. 3b. When the driver is powered, the wheel driver assembly 50 is in the activated condition shown in FIG. 3a, and the latch arm 74 in the solenoid lock 69 is held out of locking engagement with the groove 76. This permits and maintains a driving connection between the gear assembly 70 and the solenoid 68, stator 66, and rotor 64 so that the aircraft wheel can be driven on the ground. When the driver is not powered, the wheel driver assembly 50 latch arm 74 in the solenoid lock 69 is automatically pivoted into locking engagement with groove 76, moving the clutch and, thus the gear assembly, out of driving engagement with the solenoid 68, stator 66, and rotor 64. To keep tangential motor speeds at safe levels, activation of the system will not occur at speeds above an optimum maximum speed. If the wheel driver assembly 50 failed to deactivate while the aircraft was taxiing for takeoff, this would be detected and indicated to the pilot at the cockpit controls array by one of the indicators 38 or 40 so that the aircraft could be prevented from taking off, ensuring that the ground movement control system is never activated in flight.

If any one of a number of conditions occurs, the failsafe operation cuts power to the wheel driver assembly 50, causing the assembly to deactivate and then lock in the deactivated state shown in FIG. 3b as described above. Examples of conditions that could trigger the foregoing response include, for example, exceeding a selected maximum speed (about 30 miles per hour, for example), acceleration rates suggesting that takeoff roll has begun, and poor traction conditions. These faults optimally would be perceived as overspeed faults and should trigger a flashing light, preferably yellow, at indicator 38 or 40, on the cockpit controls array 16. If one of these faults has been detected by the system, the wheel driver assembly 50 will not be deactivated and then activated until the pilot cycles the cockpit switch 42 to the OFF mode and through the LOGIC and POWER modes. Any inadvertent activation of the wheel driver assembly 50 would be prevented in the event that the system switch is left on at takeoff.

If the aircraft brakes are applied, an aircraft brake signal 124 (FIG. 4) will activate a flashing light or other indicator in the cockpit controls array 16 to warn the cockpit crew. The thumbwheel lock 30, if in an ON position, will be released, the thumbwheel 28 will rotate to a neutral position, and the wheel driver assembly 50 will fully deactivate and lock in the deactivated state shown in FIG. 3b. This ensures that the present aircraft ground movement control system does not conflict with the aircraft brakes or is not activated on the runway, since brakes are always applied between engine start and the beginning of the takeoff roll. Because the wheel driver assembly 50 fails in a deactivated and locked condition, the aircraft would still be able to take off.

Figure 5:
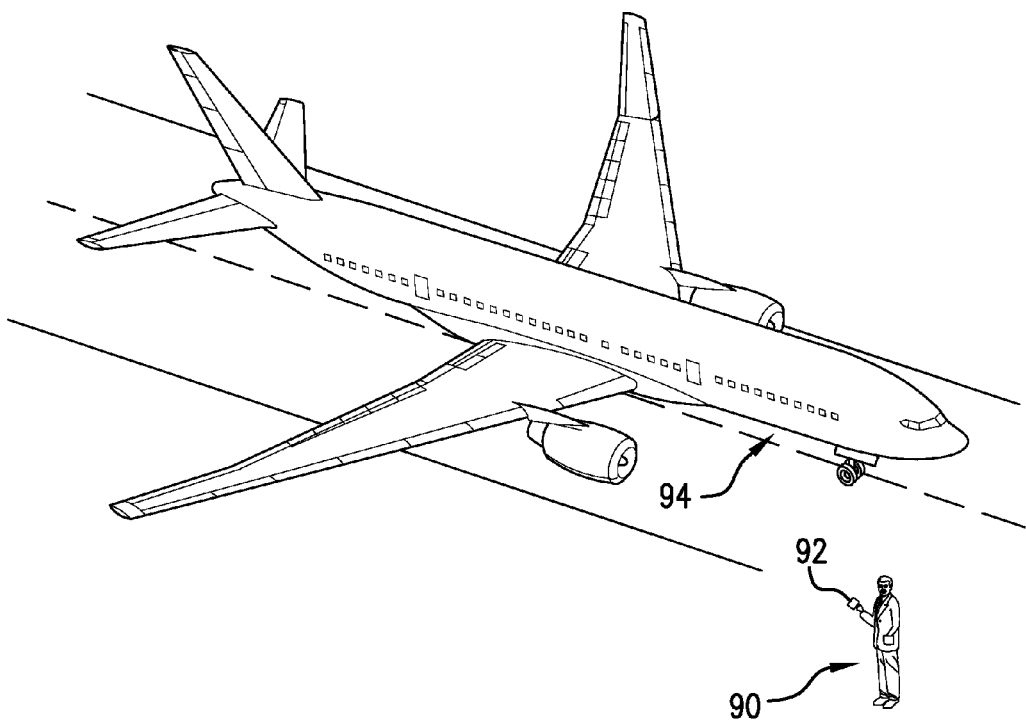
FIG. 5 illustrates an aircraft in the process of being pushed back from the gate by a ground operator with a remote control device in accordance with the present invention.

The aircraft ground movement control system of the present invention can be activated and controlled internally from the aircraft cockpit or also externally from outside the aircraft by ground personnel to achieve push back from or arrival at a gate without mechanical assistance from the tugs and tow vehicles currently used for these aircraft maneuvers. A designated ground operator 90 (FIG. 5) works from the gate or other landing facility with the aircraft cockpit crew, typically the pilot. Using a remote control apparatus 92, which is preferably a handheld device designed to access and activate designated ground movement control system cockpit controls, the ground operator can access remotely the controls needed to assist the pilot in moving the aircraft 94 in a reverse direction (push back) from the gate prior to taxiing for takeoff. Upon landing and arrival at the gate, the ground operator 90 can use the remote control apparatus 92 to move the aircraft from the runway to the gate.

A single ground operator can efficiently conduct push back or arrival operations for a number of aircraft in a significantly shorter time than is required to attach a tug and/or move each aircraft away from or toward the gate. Contact with the pilot of an aircraft scheduled to depart is made by the ground operator, and the appropriate ground movement control system cockpit controls are activated remotely by the ground operator and/or within the cockpit by the pilot. The aircraft is pushed back from the gate by the operation of one or more wheel driver assemblies 50, and the ground movement control system is fully activated and able to move the aircraft onto the runway for taxiing and takeoff. The ground operator is then free to move to the next aircraft in position for push back and begin the process again.

A handheld control apparatus 92 suitable for use by a ground operator 90 to assist a pilot with tugless push back or arrival operations should be able to establish a highly secure, preferably wireless, communication channel with the cockpit crew and the aircraft cockpit controls that activate the aircraft's ground movement control system as described above. Handheld remote access devices that use secure communications channels are known and can be adapted for use to control remotely the aircraft ground movement control system as described herein.

Since all aircraft may not have a ground movement system control apparatus installed in accordance with present invention, it will be necessary for aircraft that do have the present ground movement control system installed to be easily identified by ground operators to keep gate operations running smoothly. Optimally, all aircraft nose wheels that have the present ground movement control system will be visually identifiable instantly. The shape of this nose wheel is distinct from that of a conventional nose wheel. This distinct shape can be visually enhanced, moreover, by the use of an identifying paint color or other easily seen identifying indicia. Electronic identifying indicia, such as, for example, microchips, radio frequency tags, and the like could also be attached to components of the ground movement control system. The motor driver assembly 50 is one preferred attachment site. The ground operator's handheld remote control apparatus could be programmed to easily recognize and identify those aircraft that could be maneuvered without tugs or tow vehicles. Aircraft without electronic identifying indicia would require tugs or tow vehicles, and ground control personnel would be able to quickly communicate that need to the appropriate sources. Other types of identifying indicia that permit the rapid identification of an aircraft's ground movement system are also contemplated to be within the scope of the present invention.

To be prepared for the possibility that the movement of an aircraft between landing and takeoff without the assistance of tugs or tow vehicles by the components of the present ground movement control system cannot, for whatever reason, be accomplished, the nose wheel driver assembly 50 may include a tow bar or other structure that permits attachment of a tug, as described above in connection with FIGS. 3a and 3b.

The aircraft ground movement control system of the present invention has been described with respect to preferred embodiments. Other, equivalent, structures are also contemplated to be within the scope of the present invention.

Industrial Applicability

The aircraft ground movement control system of the present invention will find its primary applicability where it is desired to provide existing and new aircraft with the capability for controlling the ground movement of the aircraft between landing and takeoff without the assistance of external tugs or tow vehicles and where it is further desired to employ such a system to reduce aircraft fuel usage, engine turbine maintenance, and noise and to minimize flight delay as aircraft time on the ground is decreased.

The invention claimed is:

1. A system for controlling and maintaining safe ground movement of an aircraft equipped with at least one nose or main wheel capable of being powered to move the aircraft independently on the ground, comprising:
   a. a wheel driver assembly mounted to drive one or more aircraft wheels at a selected torque or speed, wherein said wheel driver assembly comprises at least a wheel drive means for driving said one or more wheels at said selected torque or speed and a powered latch means controllable to activate or deactivate said wheel drive means wherein said powered latch means comprises a solenoid powered latch arm controllably movable between a first unlocked position corresponding to activation of said wheel drive means and a second locked position corresponding to deactivation of said wheel drive means;
   b. cockpit controls adapted to direct the wheel drive means to operate at said selected torque or speed or not to operate at said selected torque or speed in communication with said wheel driver assembly and a source of power, wherein said cockpit controls comprise at least lockable and overridable torque and speed input means for controlling direction and speed of aircraft ground movement and safely maintaining said selected torque or speed, indicator means for communicating system status, and multiple position power switch means for controlling power flow from said source of power to said wheel drive assembly; and
   c. system integrator means for directing a supply of power from said source of power to said cockpit controls and to said powered latch means as required to control activation and deactivation of said wheel driver assembly to move said aircraft safely on the ground.

2. The system described in claim 1, wherein power switch means comprises a guarded switch connected to said source of power movable between a plurality of power level settings corresponding to the powering of selected system and aircraft components, and said plurality of power level settings comprises at least an "off" setting, wherein no power is supplied to any system components, at least an "on" setting, wherein power is supplied to at least a power distribution means and said wheel drive assembly, and at least an intermediate setting, wherein power is supplied to said power distribution means for distribution only to selected components of said system integrator means.

3. The system described in claim 1, further comprising power distribution means for selectively distributing power to selected system components, wherein said power distribution means is adapted to distribute AC power to said wheel drive means and DC power is to said cockpit controls in response to said power switch means setting.

4. The system described in claim 3, wherein said system integrator means is adapted to provide a control interface between said source of power, said power distribution means, said cockpit controls, and said wheel driver assembly to route AC power through said wheel driver assembly and DC power through said cockpit controls.

5. The system described in claim 4, wherein said system integrator means control interface is adapted to direct power flow to and performs reciprocal communication and control functions, monitoring and signaling functions, and detection and logging functions with said wheel driver assembly and said cockpit controls in response to ground movement conditions.

6. The system described in claim 1, wherein said one or more wheels comprise nose wheels.

7. The system described in claim 1, wherein said source of power is selected from the group of power sources comprising an aircraft auxiliary power unit, batteries, fuel cells, solar power, thermionic emission devices, burn boxes, and an aircraft's engines.

8. The system described in claim 1, further comprising failsafe control means for limiting or preventing operation of said system when ground movement operating conditions indicate operation of said system to be unsafe.

9. The system described in claim 1, wherein said power switch comprises a guarded switch movable between said multiple settings, and each of said multiple settings corresponds to a defined level of power.

10. The system described in claim 1, wherein said wheel drive means comprises an electric driver drivingly connected to said one or more wheels to rotate said one or more wheels at said selected torque or in a selected direction.

11. The system described in claim 10, wherein said electric driver is selected from the group comprising high phase order electric motors and-geared electric motors.

12. The system described in claim 1, wherein said lockable and overridable torque and speed input means is operatively connected to said wheel drive means and is adapted to operate said wheel drive means to move said one or more wheels at a torque and in a direction corresponding to movement of said lockable and overridable torque and speed input means.

13. The system described in claim 12, wherein said lockable and overridable torque and speed input means comprises lock means for maintaining said torque and speed input means in a position that maintains the wheel drive means at said selected torque or speed and override means for permitting the system to produce an overload torque above the selected torque when aircraft ground movement conditions require a torque above the selected torque.

14. The system described in claim 13, wherein said speed and torque input means comprises an input device selected from the group comprising thumbwheels, joysticks, track pads, roller balls, switches, dials, potentiometers, touch screens, keyboards, toggles, wheels, levers, and voice-activated devices.

15. A ground movement control system designed for safe ground navigation of an aircraft without reliance on thrust generated by the aircraft's main engines or external mechanical vehicles, wherein said system comprises
   a. at least one drive wheel powered by a wheel driver controllable to move an aircraft independently during ground movement at a predetermined selected optimum speed and torque by a drive control system actuatable to drive the wheel driver only when the aircraft is in contact with the ground; and
   b. a powered lock means controllable by the drive control system to respectively activate or deactivate the wheel driver to move said aircraft on the ground at said optimum speed or torque or to stop movement of said aircraft, wherein said drive control system comprises cockpit control means for manually or automatically controlling said powered lock means wherein said powered lock means comprises a solenoid-powered latch assembly adapted to operatively connect or disconnect drive components in said wheel driver, comprising a solenoid in powered communication with said drive control system, a pivotable latch arm mounted on one drive component, and a latch arm receptacle mounted on a second drive component so that said solenoid-powered latch assembly is controllably movable between an unlocked condition wherein said latch arm is pivoted into engagement with said latch arm receptacle to activate said drive components to drive the wheel driver to move said aircraft and an unlocked condition wherein said latch arm is pivoted out of engagement with said latch arm receptacle to deactivate said drive components to prevent the wheel driver from moving the aircraft.

16. A system for controlling and maintaining safe ground movement of an aircraft equipped with at least one nose or main wheel capable of being powered to move the aircraft independently on the ground, comprising:
   a. a wheel driver assembly mounted to drive one or more aircraft nose wheels at a selected torque or speed, wherein said wheel driver assembly comprises at least an electric drive motor adapted to drive said one or more wheels at said selected torque or speed, a solenoid-powered latch assembly mounted on wheel driver assembly drive components controllable to activate or deactivate said drive motor, and a source of electric power wherein said solenoid-powered latch assembly comprises a solenoid-powered latch arm controllably movable between a first position corresponding to activation of said drive motor and a second position corresponding to deactivation of said drive motor;
   b. cockpit controls in controllable powered communication with the source of electric power, the drive motor, and the solenoid-powered latch assembly adapted to activate or deactivate the drive motor and to direct the drive motor to operate at said selected torque or speed or not to operate at said selected torque or speed, wherein said cockpit controls comprise at least a lockable and overridable pilot torque and speed input, a plurality of indicators adapted to communicate system status, and a guarded multiple position power switch, wherein each of said multiple positions corresponds to a level of power flow from said source of power to said wheel drive assembly; and
   c. a system integrator and controller comprising a logic module adapted to receive information from said wheel driver assembly and cockpit controls and to direct a supply of power from said source of electric power to said cockpit controls and to said electric drive motor and said solenoid-powered latch assembly as required to control activation and deactivation of said wheel driver assembly to move or to prevent movement of said aircraft.

* * * * *